Figure 1:
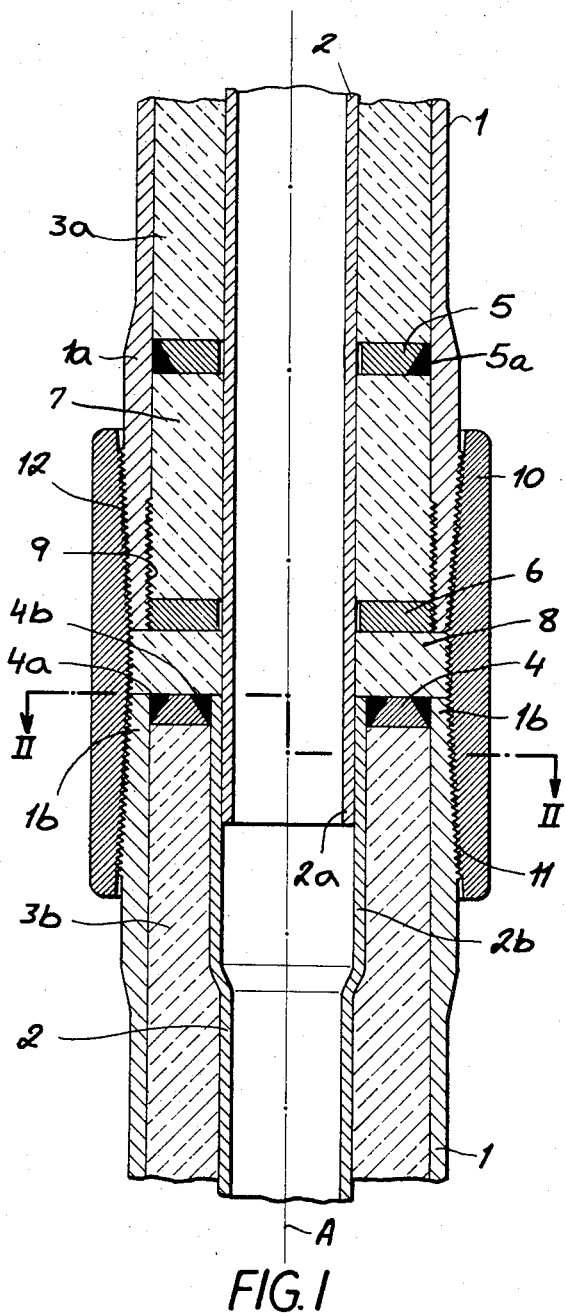

United States Patent

[11] 3,574,357

[72] Inventors Cassius Alexandru
Tirgoviste;
Petre Mihailescu; Alexandru Stanescu,
Bucharest, Romania
[21] Appl. No. 802,871
[22] Filed Feb. 27, 1969
[45] Patented Apr. 13, 1971
[73] Assignee Grupul Industrial Pentru Foray Si
Extractia Titeiului
Bucuresti,Bucuresti-Comuna Bolintinu,
Romania

[54] THERMAL INSULATING TUBING
9 Claims, 2 Drawing Figs.
[52] U.S. Cl. .................................................. 285/47,
138/149, 285/138, 285/369
[51] Int. Cl. .................................................. F16l 59/14
[50] Field of Search............................................ 285/47,
133, 138, 187, 369; 138/114, 149

[56] References Cited
UNITED STATES PATENTS
1,909,075 5/1933 Ricker et al. .................. 285/133

| | | | |
|---|---|---|---|
| 2,419,278 | 4/1947 | Motsenbocker.............. | 138/149X |
| 2,451,145 | 10/1948 | Baker et al..................... | 138/149 |
| 2,761,949 | 9/1956 | Colton........................... | 138/149X |
| FOREIGN PATENTS | | | |
| 962,180 | 7/1964 | Great Britain................ | 138/149 |
| 378,613 | 7/1964 | Switzerland.................. | 285/133 |
| 228,017 | 6/1963 | Austria.......................... | 285/133 |

Primary Examiner—Dave W. Arola
Attorney—Karl F. Ross

ABSTRACT: An insulated pipe for a deep-well string comprises two coaxial tubes, one inside the other, with a mass of thermal insulation between them. The inner tube has an enlarged upper end and a lower end that extends beyond the outer tube to allow two such pipes to telescope together. A ring connects the enlarged end of the inner tube to the inside of the outer tube while a second ring connected only to the inside of the outer tube serves as a guide for the inner tube, thereby allowing longitudinal expansion thereof. The rings act as axial walls confining the insulating mass between them.

PATENTED APR 13 1971

3,574,357

Petre Mihailescu
Cassius Alexandru
Alexandru Stanescu
INVENTORS.

BY

Karl F. Ross
Attorney

THERMAL INSULATING TUBING

Our present invention relates to an insulated pipe for use in a well string and, more particularly, to improved insulated pipe assemblies for deep-well strings adapted to introduce hot fluids into oil-bearing strata.

Known insulated pipes have certain disadvantageous characteristics. One of these is that the two coaxial tubes with insulation between them comprise a more or less rigid body (free from relative mobility between the components) since they are bonded and connected together at many points.

The admission of hot fluid or mud into the inner tube causes it and the entire pipe to expand. This expansion can cause the outer tube or casing to break free of the hardened cement or "mud" sheath around it in an operating well and bring about highly dangerous leaks. In addition, the many connections between the inner tube and the outer tube and the fact that the insulation may break down cause rather high heat looses over considerable lengths of the well string. Such pipes, e.g. as described in British Pat. Nos. 488,913 and 555,176 are commonly used to introduce hot fluids into oil-bearing strata, for example to increase oil flow from a well.

It is the principal object of our invention to provide an improved insulated pipe for use in a well string of the character described which overcomes these disadvantages.

More specific objects of our invention include the provision of an insulated pipe which constitutes an effective and permanent thermal barrier and whose inner tube can expand to a certain degree with no ill effects distortion expansion, dilation) for the outer tube.

We attain these and other objects (which will become apparent hereinafter), in accordance with the principal features of our invention, with substantially axially coextensive and coaxial inner and outer tubes spaced apart with all-around clearance over substantially their entire lengths to form an elongated annular chamber between them. The inner tube may extend at one end beyond the outer tube (the tubes terminating at their other ends flush with a common end plane) and is adapted to telescope into another such inner tube of another such insulated pipe, one of the telescoping ends being enlarged to form a socket receiving the other end.

Each lower end of the annular chamber is defined by a ring connected peripherally only to the outer tube and not to the inner tube but receiving same with some freedom of axial movement and expansion; the upper ring is also connected peripherally to the inner tube. Thus, the inner tube can expand longitudinally, with virtually no hindrance since it is only attached only at one end. In general, the rings are flattened annular discs lying wholly within the insulation chamber and forming anchors confining the insulation between them. The upper disc ring has its surface flush with the aforementioned plane.

The annular chamber between the rings is filled with thermal insulating material (e.g. of the comminuted or fibrous type). The male taper-threaded ends of two such pipes are joined together by an internally threaded sleeve or coupling, and a washer of thermal insulating material is placed between the ends of the outer tubes. The upper end of the lower pipe has a planar annular surface resulting from the flush arrangement of upper ring and tube ends, while the lower end of the upper pipe is provided with a similar flat annular surface by a threaded ring fitted into the outer tube flush with its lower end.

One of the rings or washers defining the insulating compartment is flush with the respective end of the two tubes, and the other is recessed axially therein. The axial compartment thereby created between lower ring and the lower end of the outer tube is filled with a bushing or sleeve of insulating material held in place by the threaded ring flush with the respective end of the outer tube; this ring has a central opening receiving the inner tube with play to accommodate axial expansion and, possibly dilation thereof.

A pipe so constructed has the advantages of extremely good insulating properties with extremely long and safe service life. Little opportunity is present for heat to be conducted from the inner tube to the outer one, and there is little if any hindrance to expansion of this inner tube. Thus, even with the use of very hot fluids in a well string traversing cool water-bearing strata, little heat is lost; and in an operating well, expansion of the outer tube is not likely to occur to break it free from its hardened sheath.

Figure 2:
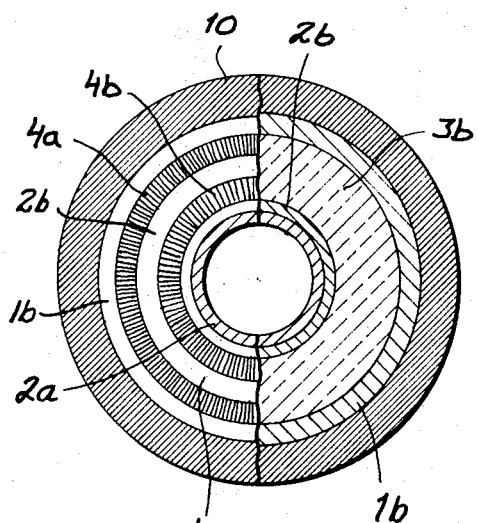

These and other objects, features, and advantages of our invention will become more readily apparent from the following description, reference to the drawing in which:

FIG. 1 is a longitudinal section through a joint between two like pipes according to our invention; and FIG. 2 is a section taken along line II–II of FIG. 1.

As shown in FIG. 1 arranged coaxially about an axis A are the upper end portion of one insulated pipe and the lower end portion of an identical pipe. The central regions of these pipes are uniform and correspond to those portions shown at the very top and the very bottom of the assembly in FIG. 1.

Each outer tube 1 has a lower end 1a and an upper end 1b, and each inner tube 2 has a lower end 2a an upper end 2b. The upper ends 1b and 2b are flush, and the lower end 2a of the inner tube 2 extends beyond the lower end 1a of the outer tube 1, and is telescopically received in the upper end 2b.

The upper ends 1b and 2b are solidly joined by a flat trapezoidal-section ring 4 welded at both its inner and outer peripheries to them by fillet-type weld seams 4a and 4b such that the ring, welds, and upper pipe ends are flush or coplanar.

In set from the lower end 1a is a second ring 5 of flat trapezoidal section which is welded only at its outer periphery by a fillet-type weld seam 5a to the outer tube 1 and loosely receives (with clearance) the inner tube 2. Insulating material 3a, 3b fills the annular chamber between the two tubes 1 and 2 and between the two rings 4 and 5 in the same pipe section.

In order to couple two pipe sections together, first bushing 7 of insulating material is fitted into the recess between the end of the tube 1a and the ring 5 and is held in place by a metal ring 6 threaded into internal threads 9 of the outer pipe end 1a flush with the axial face of the latter. Then yieldable thermally insulating washer 8 fitted around the projecting end 2a of the inner tube 2a and this end is fitted into the enlarged end 2b of the next section as a sleeve 10 is screwed onto opposed threads 11 and 12 of the ends 1b and 1a of the tube 1.

We claim:

1. An insulated pipe for a well string, said pipe comprising:
   an inner tube;
   an outer tube coaxially spacedly surrounding said inner tube and forming an elongated annular chamber therewith;
   a first ring in one end of said chamber having an inner periphery connected to the exterior of said inner tube and an outer periphery connected to the interior of said outer tube;
   a second ring in the other end of said chamber having an outer periphery connected to the interior of said outer tube and receiving said inner tube with clearance; and
   thermal insulation filling said chamber between said rings, one of said rings being substantially flush with one end of said outer tube, and the other of said rings being inset from the other end of said outer tube, and an insulating bushing between said other end of said outer tube and said other of said rings, said bushing having a radial extent limited by said outer tube.

2. The pipe defined in claim 1, further comprising a ring threaddedly engageable with the interior of said other of said ends for holding said insulating bushing in place.

3. The pipe defined in claim 1 wherein said rings are connected but circumferential welding to said tubes and one end of said inner tube projects beyond one end of said outer tube and is adapted to engage telescopically the other end of another such inner tube.

4. The pipe defined in claim 3 wherein said one end of said inner tube is telescopically received in said other end of said other such inner tube.

5. The pipe defined in claim 1 wherein said one of said rings is said first ring.

6. The pipe defined in claim 1, further comprising connecting means for longitudinally coupling two such pipes together.

7. The pipe defined in claim 6 wherein said connecting means comprises an internally threaded sleeve threadedly engageable with ends of two such outer tubes, and an insulating washer engageable between said ends of said two such outer tubes.

8. A sellstring assembly comprising two pipes each including:
an inner tube;
an outer tube coaxially spacedly surrounding said inner tube and forming an elongated annular chamber therewith;
a first ring in one end of said chamber having an inner periphery connected to the exterior of said inner tube and an outer periphery connected to the interior of said outer tube;
a second ring in the other end of said chamber having an outer periphery connected to the interior of said outer tube and receiving said inner tube with clearance;
thermal insulation filling said chamber between said rings; and
connecting means for longitudinally coupling said two pipes together, each of said inner tubes having one end substantially flush with one end of the respective outer tube and another end projecting beyond the other end of said respective outer tube, said one end of one of said inner tubes being telescopically engaged with the other end of the other of said inner tubes, said connecting means comprising a sleeve and a washer, said sleeve threadedly engaging said one end of said one of said outer tubes, said washer being engaged between said one end of said one of said outer tubes and said other end of said other of said outer tubes, said washer having a radial extent defined by said sleeve.

9. The pipe defined in claim 8 wherein said rings are connected by circumferential welding to said tubes.